2,912,425

PROCESS FOR CONTROLLING THE MOLECULAR WEIGHT OF POLYETHYLENE

Frederick E. Bailey, Jr., Charleston, and Frank J. Welch, South Charleston, W. Va., assignors to Union Carbide Corporation, a corporation of New York No Drawing. Application October 25, 1957
Serial No. 692,280

9 Claims. (Cl. 260—94.9)

The present invention relates to a process for controlling the molecular weight distribution of polyethylene. More particularly, this invention relates to the use of hydrogen chloride in the low pressure polymerization of ethylene in the presence of a catalyst slurry comprising an inert liquid hydrocarbon diluent containing titanium tetrachloride and a trialkyl aluminum compound to produce polyethylene of higher melt index, lower residual unsaturation and a more narrow molecular weight distribution than that found in polyethylene produced by the same method without the use of hydrogen chloride.

For most commercial applications it is desirable to produce polyethylene with a melt index of about 0.5–15 decigrams per minute.

Several polymerization variables affect the melt index of polyethylene produced by the low pressure method (Ziegler process) in the presence of titanium tetrachloride and a trialkyl aluminum compound. These variables include: the molar ratio of titanium tetrachloride to the trialkyl aluminum compound; the temperature of polymerization; the total catalyst concentration; and the pressure at which the polymerization occurs. A higher melt index is obtained by: increasing the molar ratio of titanium tetrachloride to trialkylaluminum; increasing the temperature; increasing the total catalyst concentration; and decreasing the pressure. However, increasing the molar ratio of titanium tetrachloride to the trialkyl aluminum compound magnifies the problem of ash removal and resin color. Increasing the temperature results in mechanical difficulties caused by increased deposit of resin on the reactor walls. Increasing the total catalyst concentration is uneconomical; and a decrease of the reaction pressure results in a decrease in productivity.

We have now found that it is possible to regulate and particularly to increase the melt index of polyethylene by conducting the catalytic polymerization in the presence of dry hydrogen chloride. In addition to a higher melt index, the polymer thus formed in the presence of hydrogen chloride contains a narrower molecular weight distribution and a lower degree of unsaturation, particularly of the vinyl type, than polyethylene of similar melt index produced in the absence of hydrogen chloride. It appears that the melt index is raised primarily by the absence of the very high molecular weight fractions of polymer produced in the low pressure system when hydrogen chloride is absent.

The improved method of polymerization is carried out by passing ethylene and small quantities of hydrogen chloride into a slurry of the catalyst in an inert liquid hydrocarbon diluent. The polymerization may be conducted at pressures as high as 300 p.s.i.g. although it is preferred to conduct the polymerization at atmospheric or near atmospheric pressures. The concentration of the hydrogen chloride may range from traces to about 10 percent by weight of the ethylene feed. The preferred range is from about 0.01 to about five percent by weight of the ethylene feed.

In the preferred method of this invention the hydrogen chloride is introduced into the stream of ethylene feed before the ethylene reaches the reactor. However, the hydrogen chloride may also be mixed with the ethylene in the reactor.

The total catalyst concentration is not critical. A range of 0.05 to 5 percent by weight of the diluent is satisfactory.

The total HCl fed into the catalyst slurry may range from about 1–100 percent by weight of the total catalyst concentration and preferably 5–25 percent by weight of the total catalyst concentration. In practice by continuously admixing 1–5 percent HCl with the olefin, based on the weight of the ethylene feed, the preferred quantity of HCl is introduced into the catalyst slurry.

Any trialkylaluminum compound may be used as one of the components of the catalyst mixture. The preferred catalysts are those which have from about 2–12 carbon atoms in each alkyl group. A few of these compounds, for example, are: triethyl aluminum, tripropyl aluminum, triisopropyl aluminum, tributyl aluminum, triisobutyl aluminum, trihexyl aluminum, trioctyl aluminum and tridodecyl aluminum.

The molar ratio of the trialkyl aluminum to titanium tetrachloride used in this invention can vary from about 0.5 to about 10 or more. The ratio employed is not narrowly critical and may be varied considerably and since the function of these compounds is as catalysts or initiators, any catalytic amount may be used. The methods of this invention are particularly effective in producing high melt index polymers when the molar ratio of trialkylaluminum to titanium tetrachloride in the catalyst mixture is less than about two at polymerization temperatures of less than 100° C.; at polymerization temperatures between about 100° C. to 200° C. the melt index increases irrespective of the molar ratio of trialkylaluminum to titanium tetrachloride. The range of temperatures which may be used for the polymerization are from about 25° C. to about 200° C.

The techniques used in combining the catalyst, diluent and monomer are well known procedures designed to exclude moisture. The alkylaluminum cocatalyst can be added to the diluent in the reaction vessel prior to the addition of the metal halide cocatalyst; however, these various components can be added in reverse order also. The reaction may be conducted in batches or continuously. A grinding medium may be present in the reaction mixture (e.g., glass beads), for the purpose of decimating the metal halide and continuously renewing exposed surfaces of the decimated particulate metal halide to the monomer.

The period of time during which the polymerization reaction is permitted to proceed is not critical. Thus, periods of 30 minutes to 4 hours or 7 days can be effectively employed. The longer the reaction period, the more complete the conversion.

The inert hydrocarbon diluent may be any aliphatic hydrocarbon such as heptane, hexane, cyclohexane and 2-ethylhexane; or any aromatic hydrocarbon such as benzene, toluene, ortho-, meta-, and para-xylene. Also, a mixture of hydrocarbons may be used. However, the hydrocarbon diluent must be free of impurities of unsaturated compounds, sulfur-containing compounds, oxygen-containing compounds, and compounds containing active hydrogen such as alcohols, amines, and water. The preferred inert diluents are heptane or hexane.

For best results, the diluent should not be in contact with the air and moisture. This is achieved by blanketing the diluent with an atmosphere of an inert gas. Some of the inert gases which may be used are: nitrogen, argon, neon, helium and methane. These gases must be free of carbon monoxide, carbon dioxide, unsaturated compounds such as propylene, and ethylene, water and other volatile components containing oxygen, sulfur, nitrogen-containing compounds (except nitrogen gas), and active hydrogen compounds which would react with the catalyst "complex" or the individual catalyst components.

The following examples are illustrative of the invention.

EXAMPLE 1

A mixture of 1.9 gms. (0.010 mole) of titanium tetrachloride and 2.0 gms. (0.010 mole) of triisobutyl-aluminum in 100 ml. of heptane was added to 400 ml. of additional heptane in a nitrogen purged flask equipped with a stirrer. Ethylene containing about 5 percent of hydrogen chloride by weight was bubbled through the catalyst suspension at 50° C. and atmospheric pressure. The rate of ethylene-HCl feed was regulated so that there would be a slight blow off of the feed through the catalyst slurry. The hydrogen chloride was bubbled at a slow rate through sulfuric acid in a trap and mixed with the ethylene stream in a T-tube before the gas streams passed into the reaction flask. After 1.8 hours, isopropyl alcohol was added to the polymer slurry to destroy the catalyst and the mixture was filtered. The polymer was washed with isopropyl alcohol and water and then dried. The product consisted of 22 gms. of white powder having a melt index of 60 decigrams per minute and a density of 0.9567 gm. per cc. Only a trace of unsaturation was indicated by infrared spectrum. When ethylene was polymerized using the same quantities of the catalyst components in the absence of hydrogen chloride, polyethylene was obtained with a melt index of about zero.

EXAMPLE 2

The results of a series of experiments in which the quantity of hydrogen chloride was varied are summarized in Table 1. For these runs, hydrogen chloride was condensed in a tared flask by cooling with liquid nitrogen. Weighed quantities of the liquid hydrogen chloride were vaporized slowly and allowed to bubble through sulfuric acid in a trap before introduction into the ethylene stream. The quantities of reactants and diluent and the work-up procedure were the same as that described in Example 1.

*Table I*

| HCl, gms. | TiCl₄, gms. | Percent HCl in Ethylene Feed (by weight) | Molar ratio of triisobutyl aluminum to titanium tetrachloride | Yield, gms. | Melt Index (dg. per min.) |
|---|---|---|---|---|---|
| 2.5 | 1.9 | about 5.0 | 1.0 | 33 | 56.5 |
| 2.0 | 1.9 | about 3.0 | 1.0 | 43 | 24.7 |
| 1.0 | 1.9 | about 1.0 | 1.0 | 60 | 15.6 |
| 0 | ¹ 3.8 | 0 | 1.0 | 81 | 0 |

¹ Control was carried out on twice the scale of the other experiments.

EXAMPLE 3

A catalyst mixture prepared from 1.9 gms. (0.010 mole) titanium tetrachloride and 4.0 gms. (0.020 mole) triisobutyl aluminum in 100 ml. of deodorized kerosene (Bayol-D) was added to 900 ml. of additional kerosene at 150° C. Ethylene containing hydrogen chloride was introduced at 150° C. and atmospheric pressure. The hydrogen chloride was produced in a generator consisting of a micro burette containing concentrated hydrochloric acid attached to a filter flask containing concentrated sulfuric acid. The tip of the burette was dipped below the surface of the sulfuric acid. As the hydrochloric acid was very slowly added to the sulfuric acid, hydrogen chloride gas was evolved. The hydrogen chloride was mixed with the ethylene stream feeding the polymerization. The quantities of reactants and diluent and the work-up procedure were the same as that described in Example 1. Table II summarizes the results.

*Table II*

| Percent HCl in Feed Gas | Volume of Concentrated HCl to Generator (Ml.) | Yield of Polyethylene (gms.) | Melt Index |
|---|---|---|---|
| about 5.0 | 1.25 | 12 | 0.95 |
| about 1.0 | 0.25 | 19 | 0.60 |
| 0 | 0.0 | 32 | 0.26 |

EXAMPLE 4

A catalyst mixture prepared from 1.9 gms. (0.010 mole) of titanium tetrachloride and 2.0 gms. (0.010 mole) triisobutyl-aluminum in 100 ml. of hexane was diluted with 400 ml. of hexane. Ethylene containing hydrogen chloride was introduced at 50° C. The hydrogen chloride was generated in the manner described in Example 3. The product was recovered as described in Example 1. A yield of 49 gms. of polyethylene was produced having a melt index of 15. The sample had a narrower molecular weight distribution than polyethylene of somewhat lower melt index produced in the same manner but in the absence of hydrogen chloride as shown in Table III.

*Table III*

PERCENT OF RESIN IN THE STATED MOLECULAR WEIGHT RANGES

| Melt Index | 0 to 10,000 | 10,000 to 30,000 | 30,000 to 100,000 | 100,000 to 150,000 | Above 150,000 |
|---|---|---|---|---|---|
| 15.0 (with HCl) | 16 | 58 | 20 | 6 | less than 1. |
| 8.3 (without HCl) | 22 | 35 | 35 | 5 | 3. |
| 0.8 (without HCl) | 14 | 28 | 35 | 8 | 15. |

Even though the hydrogen chloride-modified resin is of much higher melt index than the resins made in the absence of hydrogen chloride, it has no greater very low molecular weight fraction. This data shows that hydrogen chloride sharpens the molecular weight distribution by reducing the percentage of very high molecular weight resin (that above 100,000), and also that it does not increase the low molecular weight fraction.

EXAMPLE 5

Using a catalyst mixture composed of 1.9 gms. (0.010 mole) of titanium tetrachloride and only 0.8 gm. (0.004 mole) of triisobutylaluminum, a series of experiments was performed using the method of hydrogen chloride addition described in Example 3. The polymerization was carried out at 50° C. and atmospheric pressure using hexane as the diluent. Table IV summarizes the results.

*Table IV*

| Percent HCl in Ethylene Feed | Volume of Concentrated HCl Added | Yield | Melt Index |
|---|---|---|---|
| About 2.0 | 0.72 | 19 | 9.1 |
| About 1.0 | 0.36 | 11 | 7.8 |
| 0.0 | 0.00 | 27 | 4.3 |

The procedure used for measuring the melt index is that of A.S.T.M. D 1238–57T, procedure A.

What is claimed is:

1. The improvement in the process for polymerizing ethylene in the presence of a catalyst slurry comprising titanium tetrachloride and a trialkyl aluminum compound in an inert liquid hydrocarbon diluent, the step which comprises admixing 0.01 to 5 percent of dry hydrogen chloride by weight, based on the ethylene, into the ethylene feed and subsequently polymerizing the ethylene by progressively passing the ethylene and hydrogen chloride mixture into the catalyst slurry wherein: each alkyl group of the aluminum compound has from 2 to 12 carbon atoms; the total catalyst concentration is from 0.05 to 5 percent by weight of the diluent; and the total hydrogen chloride admixed with the ethylene feed is from 1 to 100 percent by weight of the total catalyst concentration.

2. The improvement in the process for polymerizing ethylene in the presence of a catalyst composed of titanium tetrachloride and a trialkyl aluminum compound, wherein each alkyl group of the aluminum compound has from 2 to 12 carbon atoms, and wherein the catalyst is in the form of a slurry in an inert liquid hydrocarbon diluent, the step which comprises adding 0.01 to 5 percent by weight of dry hydrogen chloride, based on the ethylene, to said ethylene prior to polymerization and subsequently contacting the ethylene and hydrogen chloride mixture with the catalyst to cause polymerization.

3. The process of claim 2 wherein the trialkyl aluminum compound is triisobutyl aluminum.

4. The process of claim 2 wherein the trialkyl aluminum compound is triethyl aluminum.

5. The process of claim 2 wherein the trialkyl aluminum compound is tributyl aluminum.

6. In the process for producing polyethylene by polymerizing ethylene in the presence of a catalyst slurry comprising titanium tetrachloride and a trialkylaluminum compound in an inert liquid hydrocarbon diluent, the improvement for increasing the melt index of the polyethylene which comprises adding from about 0.01% to about 10% of dry hydrogen chloride, based on the weight of ethylene, to said ethylene prior to polymerization and subsequently contacting the ethylene and hydrogen chloride mixture with the catalyst slurry to cause polymerization.

7. The process of claim 6 wherein the quantity of dry hydrogen chloride varies from about 0.01 to about 5%.

8. The process of claim 6 wherein the polymerization is conducted at a temperature of about 100° C. to about 200° C. and the quantity of hydrogen chloride employed varies from 0.01% to 5%.

9. The process of claim 6 wherein the polymerization is conducted at a temperature of about 25° C. to about 100° C. and the molar ratio of the trialkylaluminum compound to the titanium tetrachloride is from 1:0.5 to 1:2.

No references cited.